US010073801B2

(12) United States Patent
Uemura et al.

(10) Patent No.: US 10,073,801 B2
(45) Date of Patent: Sep. 11, 2018

(54) COMPUTER AND METHOD OF CONTROLLING I/O SWITCH OF COMPUTER

(71) Applicant: Hitachi, Ltd., Tokyo (JP)

(72) Inventors: Satoru Uemura, Tokyo (JP); Isao Oohara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 15/122,546

(22) PCT Filed: Apr. 25, 2014

(86) PCT No.: PCT/JP2014/061650
§ 371 (c)(1),
(2) Date: Aug. 30, 2016

(87) PCT Pub. No.: WO2015/162774
PCT Pub. Date: Oct. 29, 2015

(65) Prior Publication Data
US 2017/0091134 A1  Mar. 30, 2017

(51) Int. Cl.
G06F 13/00 (2006.01)
G06F 13/40 (2006.01)
G06F 13/42 (2006.01)

(52) U.S. Cl.
CPC ...... G06F 13/4022 (2013.01); G06F 13/4282 (2013.01)

(58) Field of Classification Search
None
See application file for complete search history.

(56) References Cited

U.S. PATENT DOCUMENTS 6,899,278 B2 * 5/2005 Chen ................... G06K 19/07
235/380
8,285,911 B2 * 10/2012 Itakura ............... G06F 11/2033
370/389

(Continued)

FOREIGN PATENT DOCUMENTS

JP 2009-282773 A 12/2009

OTHER PUBLICATIONS

International Search Report of PCT/JP2014/061650 dated Jul. 15, 2014.

Primary Examiner — Elias Mamo
(74) Attorney, Agent, or Firm — Mattingly & Malur, PC

(57) ABSTRACT

A computer achieves an increase in throughput by controlling a connection state between each port of an I/O controller and an I/O switch, thereby improving throughput imbalance between the ports of the I/O controller. The computer is provided with: an I/O switch; an I/O device connected to the I/O switch; a management controller; and an I/O controller including a plurality of ports. The management controller detects a connection state with the I/O switch, and acquires the number of virtual switches associated with the detected connection state with the I/O switch by referring to configuration management information for managing the connection state with the I/O switch in association with the number of the virtual switches. The management controller sets the acquired number of the virtual switches for each I/O switch that is connected. Each port of the I/O controller connects with the I/O device via the virtual switches that are set.

10 Claims, 12 Drawing Sheets

(56) References Cited

U.S. PATENT DOCUMENTS

| | | | | |
|---|---|---|---|---|
| 8,767,529 B2* | 7/2014 | Kamath | ............. | H04L 41/0668 370/217 |
| 2005/0044284 A1* | 2/2005 | Pescatore | ............ | G06F 13/4009 710/15 |
| 2006/0242353 A1* | 10/2006 | Torudbakken | ...... | G06F 13/4022 710/316 |
| 2013/0346531 A1* | 12/2013 | Hummel | ............. | G06F 13/4022 709/212 |

* cited by examiner

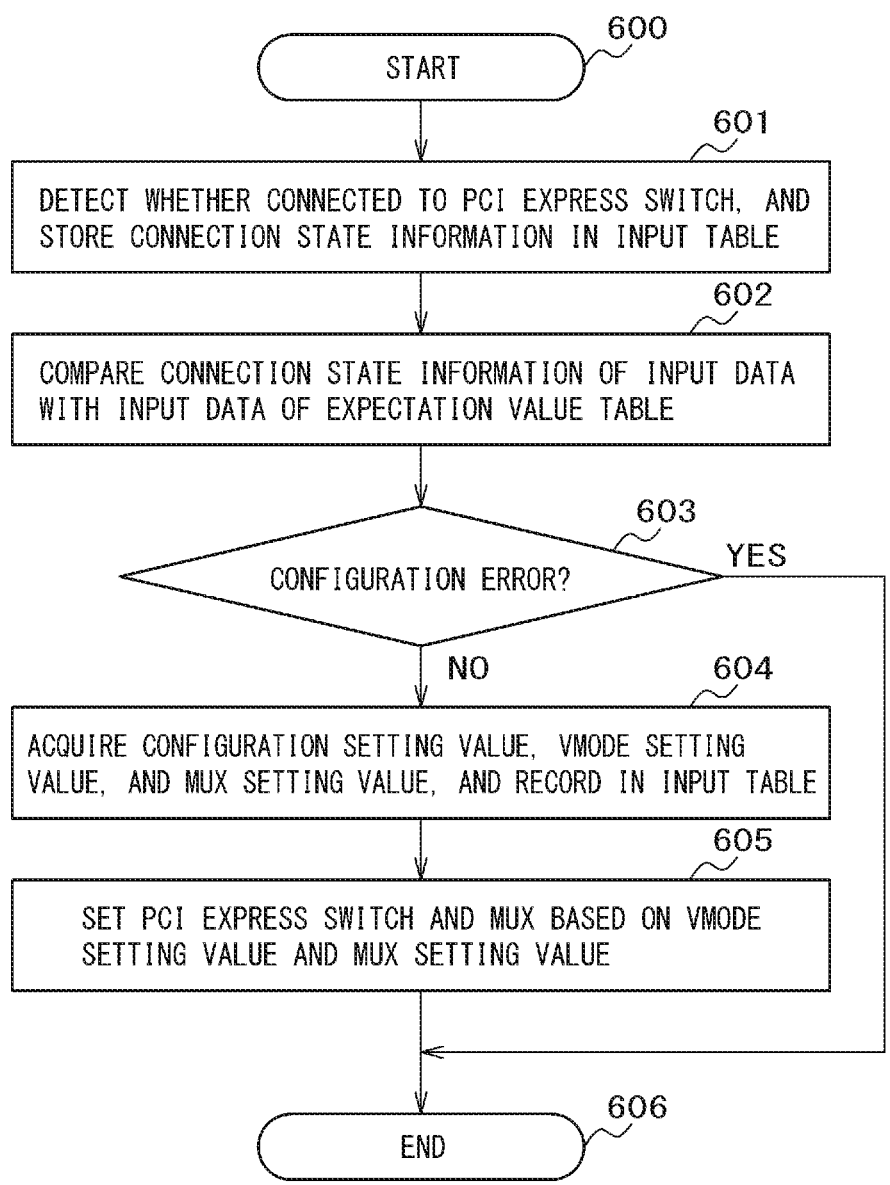

| # | INPUT DATA (P:Present, A:Absent) |||| CONFIGURATION SETTING VALUE | VMODE SETTING VALUE (NUMBER OF VIRTUAL SWITCHES) | MUX SETTING VALUE (IN:Internal, EX:External) |||
|---|---|---|---|---|---|---|---|---|---|
|   | RP-A | RP-B | RP-C | RP-D |   |   | MUX B | MUX C | MUX D |
| 1 |   |   |   |   |   |   |   |   |   |

701 — INPUT DATA; 702 — CONFIGURATION SETTING VALUE; 703 — VMODE SETTING VALUE; 704 — MUX SETTING VALUE

| # | INPUT DATA (P:Present, A:Absent) |||| CONFIGURATION SETTING VALUE | VMODE SETTING VALUE (NUMBER OF VIRTUAL SWITCHES) | MUX SETTING VALUE (IN:Internal, EX:External) |||
|---|---|---|---|---|---|---|---|---|---|
|   | RP-A | RP-B | RP-C | RP-D |   |   | MUX B | MUX C | MUX D |
| 1 | P | P | P | P | 4 to 16 | 1 | EX | EX | EX |
| 2 | P | P | P | A | 4 to 16 | 1 | EX | EX | EX |
| 3 | P | P | A | P | 4 to 16 | 1 | EX | EX | EX |
| 4 | P | P | A | A | 4 to 16 | 1 | EX | EX | EX |
| 5 | P | A | P | P | 4 to 16 | 1 | EX | EX | EX |
| 6 | P | A | P | A | 4 to 8 | 2 | IN | EX | EX |
| 7 | P | A | A | P | 4 to 16 | 1 | EX | EX | EX |
| 8 | P | A | A | A | 4 to 4 | 4 | IN | IN | IN |
| 9 | A | P | P | P | Error | — | — | — | — |
| 10 | A | P | P | A | Error | — | — | — | — |
| 11 | A | P | A | P | Error | — | — | — | — |
| 12 | A | P | A | A | Error | — | — | — | — |
| 13 | A | A | P | P | Error | — | — | — | — |
| 14 | A | A | P | A | Error | — | — | — | — |
| 15 | A | A | A | P | Error | — | — | — | — |
| 16 | A | A | A | A | Error | — | — | — | — |

801 — INPUT DATA; 802 — CONFIGURATION SETTING VALUE; 803 — VMODE SETTING VALUE; 804 — MUX SETTING VALUE

| # | INPUT DATA (P:Present, A:Absent) | | | | CONFIGURATION SETTING VALUE | VMODE SETTING VALUE (NUMBER OF VIRTUAL SWITCHES) |
|---|---|---|---|---|---|---|
| | RP-A | RP-B | RP-C | RP-D | | |
| 1 | | | | | | |

FIG.15

| # | INPUT DATA (P:Present, A:Absent) | | | | CONFIGURATION SETTING VALUE | VMODE SETTING VALUE (NUMBER OF VIRTUAL SWITCHES) |
|---|---|---|---|---|---|---|
| | RP-A | RP-B | RP-C | RP-D | | |
| 1 | P | P | P | P | 4 to 16 | 1 |
| 2 | P | P | P | A | 4 to 16 | 1 |
| 3 | P | P | A | P | 4 to 16 | 1 |
| 4 | P | P | A | A | 4 to 16 | 1 |
| 5 | P | A | P | P | 4 to 16 | 1 |
| 6 | P | A | P | A | 4 to 8 | 2 |
| 7 | P | A | A | P | 4 to 16 | 1 |
| 8 | P | A | A | A | 4 to 4 | 4 |
| 9 | A | P | P | P | 4 to 16 | 1 |
| 10 | A | P | P | A | 4 to 16 | 1 |
| 11 | A | P | A | P | 4 to 16 | 1 |
| 12 | A | P | A | A | 4 to 8 | 2 |
| 13 | A | A | P | P | 4 to 16 | 1 |
| 14 | A | A | P | A | 4 to 16 | 1 |
| 15 | A | A | A | P | 4 to 16 | 1 |
| 16 | A | A | A | A | Error | - |

COMPUTER AND METHOD OF CONTROLLING I/O SWITCH OF COMPUTER

TECHNICAL FIELD

The present invention relates to a computer and a method of controlling an I/O switch of the computer.

BACKGROUND ART

Japanese Patent Application Publication No. 2009-282773 (Patent Literature 1) is the background art of the present technical field. This publication describes "A' data transfer system which can provide an optimum route for its use, in a system including a PCI Express switch" (see Abstract).

CITATION LIST

Patent Literature

Patent Literature 1: Japanese Patent Application Publication No. 2009-282773

SUMMARY OF INVENTION

Technical Problem

Patent Literature 1 does not make the assumption that, in a computer in which ports of an I/O controller is connected to I/O devices through an I/O switch, the throughput varies between the ports of the I/O controller, in accordance with the number of I/O devices to be connected to the ports of the I/O controller, thereby lowering the throughput of the I/O controller.

According to the present invention, there is provided a computer with improved throughput and an improved throughput deviation between the ports of the I/O controller, by controlling a connection state of the ports of the I/O controller and the I/O switch, there is also provided a method of controlling the I/O switch of the computer.

Solution to Problem

To solve the above problem, the computer of the present invention includes one or more I/O switches, one or more I/O devices connected to the one or more I/O switches, a management controller, and an I/O controller having a plurality of ports. The management controller stores configuration management information for managing a connection state with the one or more I/O switches and the number of virtual switches in association with each other. The management controller detects the connection state with the one or more I/O switches, and acquires the number of virtual switches corresponding to the detected connection state with the I/O switches, by referring to the configuration management information. The management controller sets the acquired number of virtual switches respectively for the I/O switches to be connected, of the one or more I/O switches. The ports of the I/O controller are connected to the one or more I/O devices, via the set virtual switches.

Advantageous Effects of Invention

According to the present invention, it is possible to improve the throughput deviation between the ports of the I/O controller and to improve the throughput. Any matters, configurations, and effects other than the above will be apparent from the descriptions of the following embodiments.

BRIEF DESCRIPTION OF DRAWINGS

FIG. 6 is a flowchart showing a setting process for a PCI Express Switch and a multiplexer in the second embodiment.

FIG. 7 is a diagram illustrating a configuration of an input table in the first embodiment.

FIG. 8 is a diagram illustrating a configuration of an expectation value table in the first embodiment.

FIG. 15 is a diagram illustrating a configuration of an expectation value table in the second embodiment.

DESCRIPTION OF EMBODIMENTS

Embodiments will hereinafter be described using drawings.

First Embodiment

Figure 1:
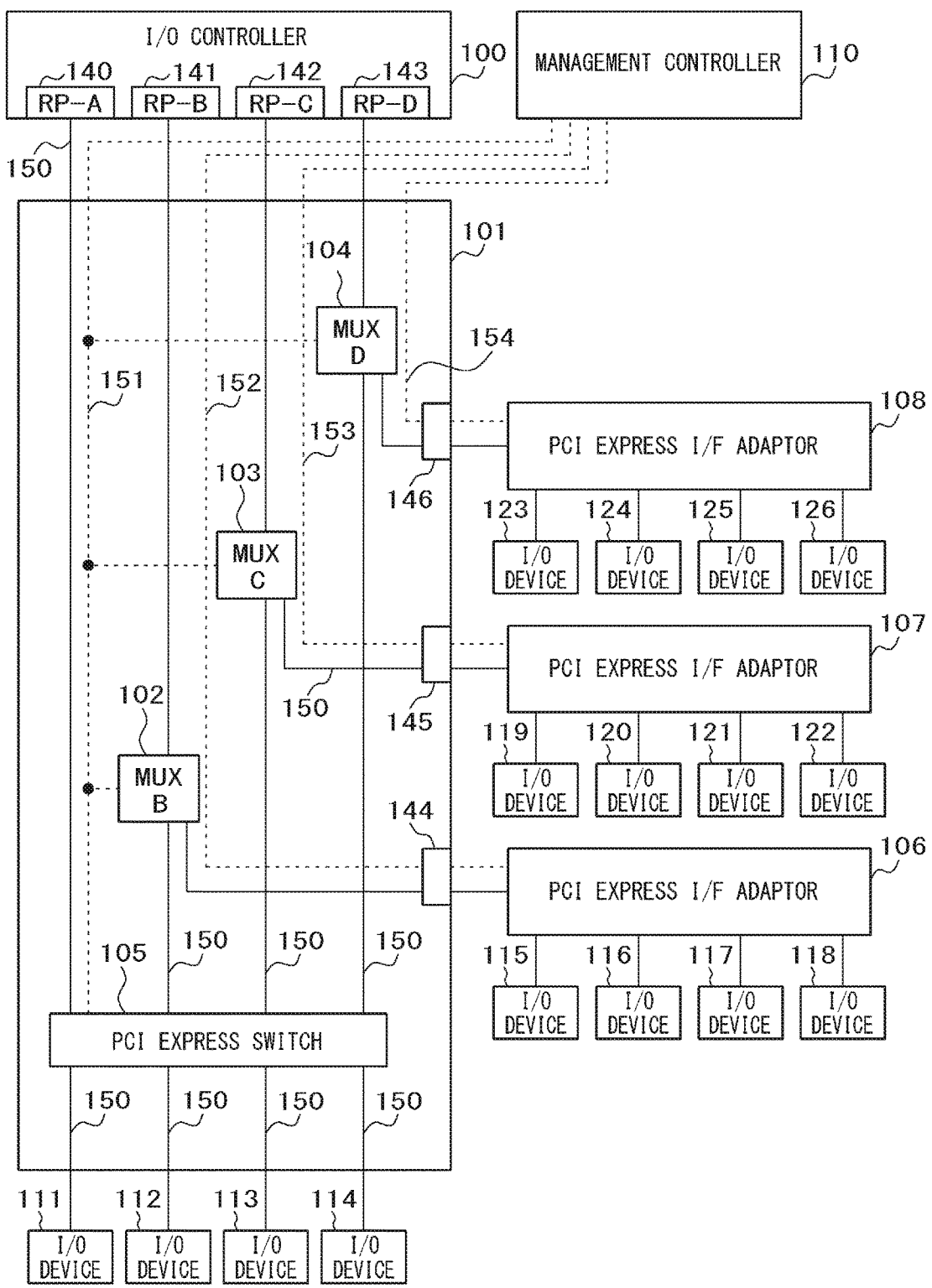
FIG. 1 is a diagram illustrating a configuration of a computer in a first embodiment.

FIG. 1 is a diagram illustrating a configuration of a computer. The computer is, for example, a server unit or a memory unit. The computer has an I/O controller (Input/Output Controller) 100, PCI Express I/F (interface) adaptors 101, 106 to 108, a management controller 110, and I/O devices 111 to 126. The PCI Express I/F adaptor 101 is the master, while the PCI Express I/F adaptors 106 to 108 are slaves. The configuration of the computer does not necessarily include a part or the entire of the PCI Express I/F adaptor 106 to 108 and the I/O devices 111 to 126.

The I/O devices 111 to 126 are connected to a network, such as a SAN (Storage Area Network), and connected to an external unit, such as a memory unit or a server unit through the network. The computer is connected to an external unit through the I/O devices 111 to 126 or the network, to transmit and receive information (for example, input/output instructions or a response to input/output instructions).

The I/O controller 100 has a CPU, a memory, and a plurality of root ports (Root Ports: RP) 140 to 143. In the embodiment below, the I/O controller 100 will be described as one having four root ports, RP-A140, RP-B141, RP-C142, RP-D143.

The PCI Express I/F adaptor 101 includes multiplexers (multiplexers: MUX, multiplexer switches) MUX B102, MUX C103, MUX D104), a PCI Express Switch (switch) 105, and external ports 144 to 146.

The RP-A140 of the I/O controller 100 is connected to the PCI Express Switch 105, through a signal line 150. The RP-B141 is connected to the MUX B102 through the signal line 150. The MUX B102 is connected to the PCI Express Switch 105 and the external port 144 through the signal line 150.

Similarly, the RP-C142 is connected to the MUX C103 through the signal line 150. The MUX C 103 is connected to the Switch 105 and the external port 145 through the signal line 150. The RP-D143 is connected to the MUX D104 through the signal line 150. The MUX D104 is connected to the PCI Express Switch 105 and the external port 146 through the signal lines 150.

The PCI Express Switch 105 is connectable to the I/O devices 111 to 126. The external ports 144, 145, 146 connected to the MUX B102, MUX C103, MUX D104 are connected respectively to the PCI Express I/F adaptors 106, 107, 108. The external ports 144 to 146 of the PCI Express I/F adaptor 101 and the external ports of the PCI Express I/F adaptors 106 to 108 are connected with each other through the signal lines 150, and its connections can arbitrarily be changed.

For example, the computer illustrated in FIG. 1 is configured with the PCI Express I/F adaptors 101, 106 to 108. Assuming that the I/O devices up to four can be connected to the I/F adaptors 101, 106 to 108, the computer illustrated in FIG. 1 is connected to sixteen I/O devices 111 to 126.

The management controller 110 is connected to the MUX B102, MUX C103, MUX D104, PCI Express Switch 105 of the PCI Express I/F adaptor 101, through a control signal line 151. The management controller 110 is connected to the PCI Express Switch 105 of each of the PCI Express I/F adaptors 106, 107, 108 through control signal lines 152, 153, 154 and a control signal line 155, via the external ports 144, 145, 146 of the PCI Express I/F adaptor 101.

The signal lines 150 can mutually, or the control signal lines 151 to 156 can mutually be connected. However, the signal lines 150 and the control signal lines 151 to 155 are not connected with each other. The signal lines 150 are cables for transmitting information (for example, input/output instructions, responses for input/output instructions) or wirings on the printed substrate, between the I/O controller 100 and the I/O devices 111 to 126. The control signal lines 151 to 155 are signal lines for transmitting control information between the management controller 110, the MUX B102, MUX C103, MUX D104, and the PCI Express Switches 105.

Figure 2:
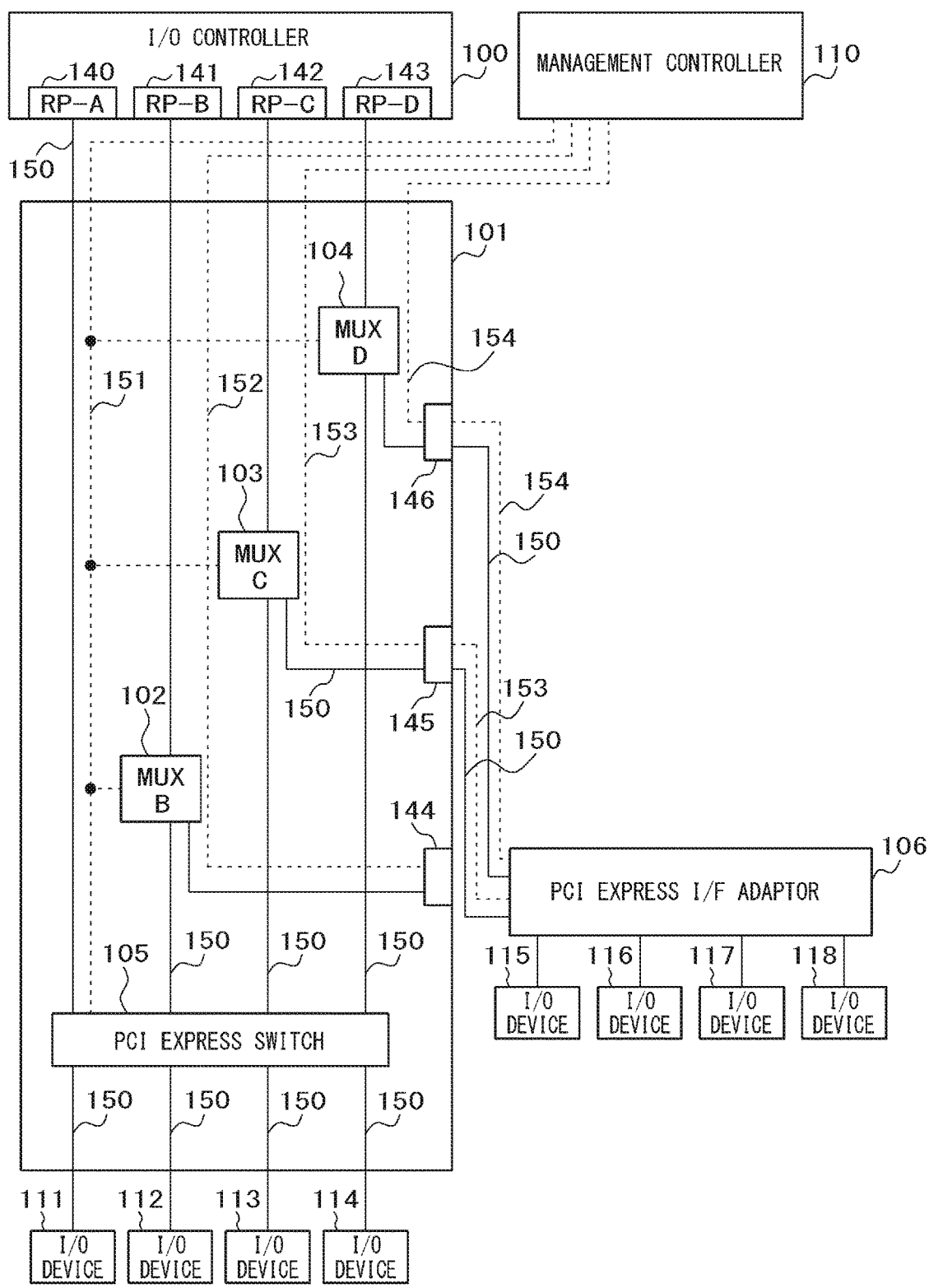
FIG. 2 is a diagram illustrating a first modification example of the configuration of the computer in the first embodiment.

FIG. 2 is a diagram illustrating a first modification example of a configuration of the computer. Descriptions will now be made of a different configuration of the computer illustrated in FIG. 2, from that of the computer illustrated in FIG. 1. The PCI Express I/F adaptor 106 of the computer illustrated in FIG. 2 is not connected to the external port 144 of the PCI Express I/F adaptor 101, but connected to the external ports 145, 146 through the signal line 150, control signal lines 153, 154. The PCI Express I/F adaptor 101 is not connected to the PCI Express I/F adaptor 107, 108. Assuming that the I/O devices up to four can be connected to the PCI Express I/F adaptor 101, 106, the computer illustrated in FIG. 2 can be connected to the eight I/O devices 111 to 118.

Figure 3:
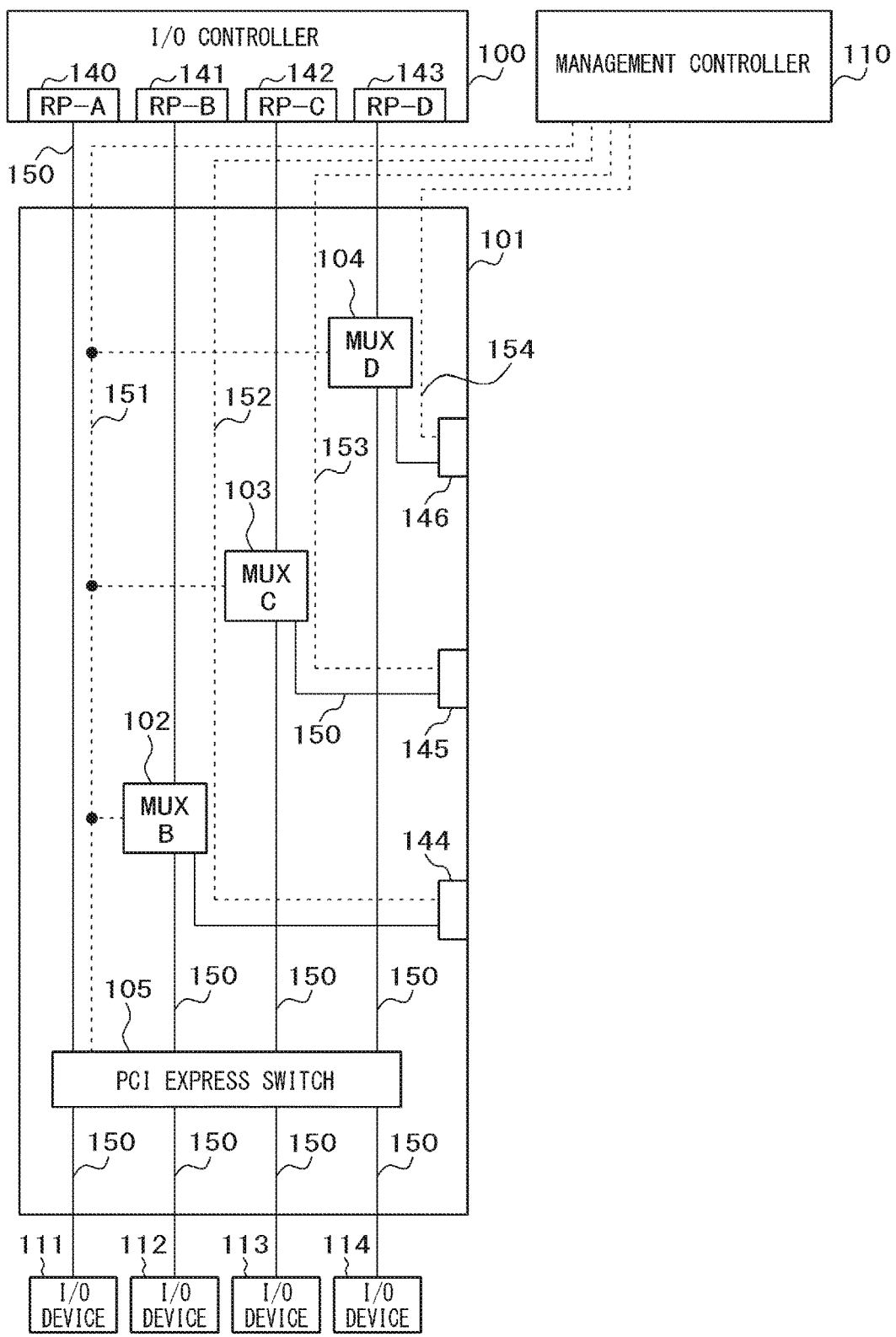
FIG. 3 is a diagram illustrating a second modification example of the configuration of the computer in the first embodiment.

FIG. 3 is a diagram illustrating a second modification example of a configuration of the computer. Descriptions will now be made of a different configuration of the computer illustrated in FIG. 3, from that of the configuration illustrated in FIG. 1. The external ports 144, 145, 146 of the PCI Express I/F adaptor 101 of the computer illustrated in FIG. 3 are not connected to any of the PCI Express I/F adaptors 106, 107, 108. Assuming that the I/O devices up to four can be connected to the PCI Express I/F adaptor 101, the computer illustrated in FIG. 3 can be connected to the four I/O devices 111 to 114.

To change from the configuration of the computer illustrated in FIG. 1 to the configuration of the computer illustrated in FIG. 2 or FIG. 3, a connection change may be made to the signal line 150, control signal lines 151 to 154 between, for example, the external ports 144, 145, 146 and the PCI Express I/F adaptors 106, 107, 108. The configuration of the computer is not limited only to the configurations of FIG. 1 to FIG. 3.

Figure 4:
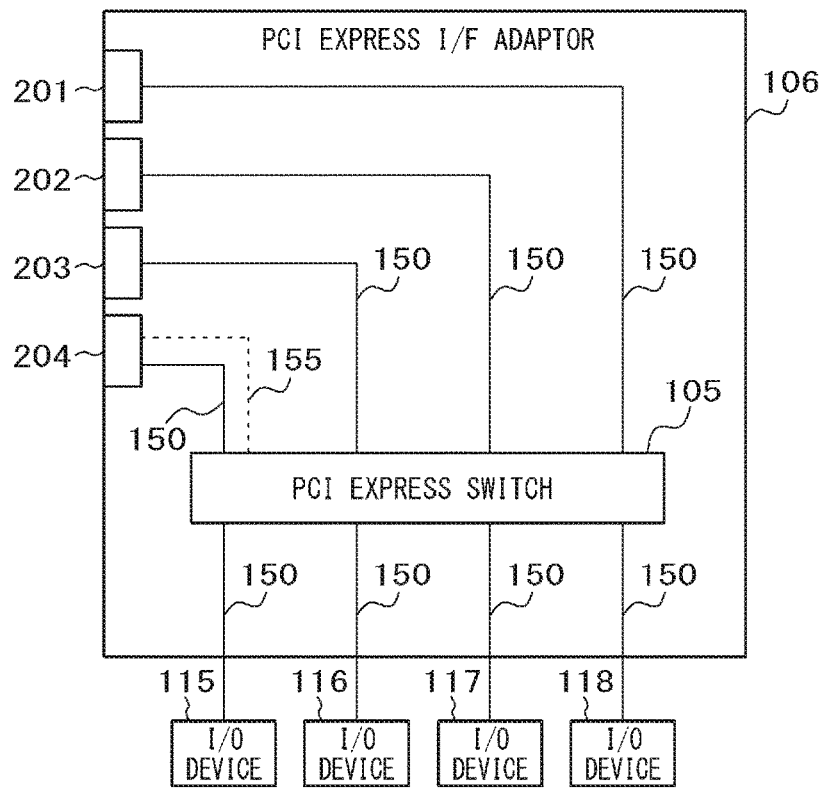
FIG. 4 is a diagram illustrating a configuration of a PCI Express I/F adaptor in the first embodiment.

FIG. 4 is a diagram illustrating a configuration of the PCI Express I/F adaptor 106. The PCI Express I/F adaptor 106 has four external ports 201 to 204, which are connected to the PCI Express Switch 105 through the signal lines 150. The PCI Express Switch 105 can be connected to the I/O devices 115 to 118.

In the PCI Express I/F adaptor 106, the external port 204 as one of the four external ports and the PCI Express Switch 105 are connected with each other through a control signal line 155. For example, in the case of the configuration of the computer illustrated in FIG. 1, the management controller 110 is connected to the PCI Express Switch 105 of the PCI Express I/F adaptor 106 via the control signal lines 152, 155. For example, in the case of the configuration of the computer illustrated in FIG. 2, the management controller 110 is connected to the PCI Express Switch 105 of the PCI Express I/F adaptor 106 via the control signal lines 153, 155.

The configuration of the PCI Express I/F adaptors 107, 108 is also the same as the PCI Express I/F adaptor 106. The PCI Express I/F adaptor 107 can be connected to each of I/O devices 119 to 122. The PCI Express I/F adaptor 108 can be connected to each of the I/O devices 123 to 126.

Figure 5:
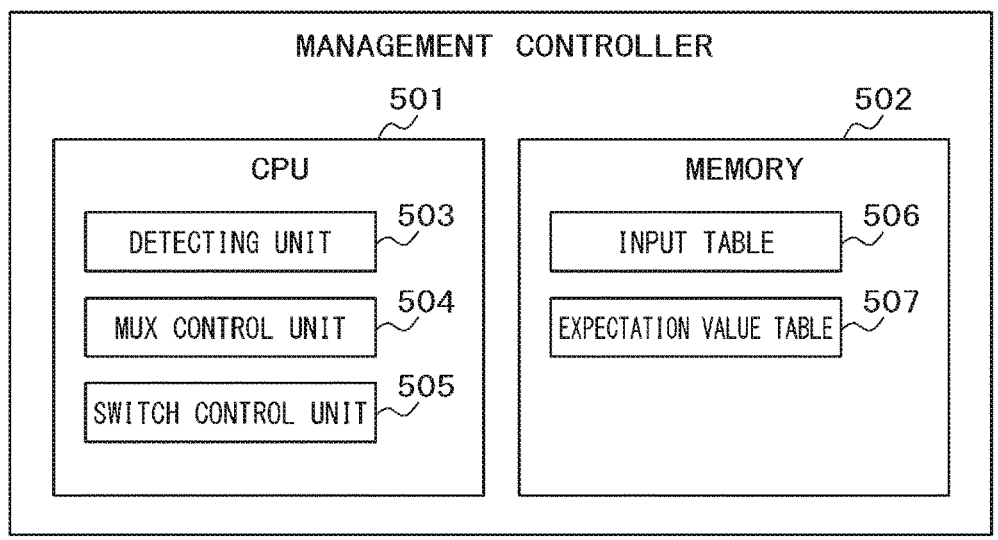
FIG. 5 is a diagram illustrating a configuration of a management controller in the first embodiment.

FIG. 5 is a diagram illustrating a configuration of the management controller 110. The management controller 110 is, for example, a BMC (Baseboard Management Controller) or a service processor (Service Processor: SVP). The management controller 110 has the CPU 501 and the memory 502. The CPU 501 has a detecting unit 503, a MUX control unit 504 controlling the multiplexers 102 to 104, and a switch control unit 505 controlling the PCI Express switch 105. The detecting unit 503, the MUX control unit 504, the switch control unit 505 may be the hardware, or may be realized by the software executed by the CPU 501. The memory 502 has an input table 506 and an expectation value table 507.

FIG. 7 is a diagram illustrating a configuration of the input table 506. The input table 506 is configuration setting information representing the configuration of the computer. The input table 506 manages input data (input information, Input Data) 701, a configuration setting value 702, a VMODE setting value 703, and a MUX setting value 704, in association with each other. Items of the input table 506 have the values that may be changed in accordance with the configuration of the computer.

The items of RP-A, RP-B, RP-C, RP-D of the input data 701 are connection state information representing whether or not the management controller 110 is connected to the PCI Express Switch 105 of each of the PCI Express I/F adaptors 101, 106 to 108. In the case where it is connected, for example, "P (Present)" is recorded. In the case where it is not connected, for example, for example, "A (Absent)" is recorded.

In the case of the configuration of the computer illustrated in FIG. 1, the management controller 110 is connected to the PCI Express Switch 105 of each of the PCI Express I/F adaptors 101, 106, 107, 108, through the control signal lines 151 to 155. In this case, in the items of RP-A, RP-B, RP-C, RP-D of the input data 701, "P" as information representing that the connection is made is recorded.

In the case of the configuration of the computer illustrated in FIG. 2, the management controller 110 is connected to the PCI Express Switches 105 of the PCI Express I/F adaptors 101, 106, through the control signal lines 151, 153, 155. The management controller 110 is not connected to the PCI Express Switches 105 via the external ports 144, 146. In this case, for example, "P", "A", "P", "A" are respectively recorded in the items of RP-A, RP-B, RP-C, RP-D of the input data 701.

In the case of the configuration of the computer illustrated in FIG. 3, the management controller 110 is connected to the PCI Express Switch 105 of the PCI Express I/F adaptor 101, through the control signal line 151. The management controller 110 is not connected to the PCI Express Switches 105 of the PCI Express I/F adaptors 106 to 108. In this case, for example, "P", "A", "A", "A" are recorded respectively in the items of RP-A, RP-B, RP-C, RP-D of the input data 701.

FIG. 8 is a diagram illustrating a configuration of the expectation value table 507. The expectation value table 507 is configuration management information for managing input data (input information, Input Data) 801, configuration setting values 802, VMODE setting values 803, and MUX setting values 804, in association with each other. Values are input in advance in the items of the expectation value table 507. Unlike the input table 506, the values are not updated in the items of the expectation value table 507, even if the configuration of the computer is changed.

FIG. 6 is a flowchart showing a setting process for the PCI Express Switch 105 and the multiplexers 102 to 104.

In Step 600, the management controller 110 starts a setting process for the PCI Express Switch 105 and the multiplexers 102 to 104. This starting timing includes, for example, timing when the computer is activated, timing when the management controller 110 detects a configuration change of the computer, or timing when the management controller 110 receives a request for starting the setting process from the user or the management computer.

In Step 601, the detecting unit 503 of the management controller 110 detects whether connection is made to the PCI Express Switches 105 of the PCI Express I/F adaptors 101, 106, 107, 108 via the control signal lines 151 to 155. The management controller 110 stores connection state information representing whether the connection is made to each of the PCI Express Switches 105 of the PCI Express I/F adaptors 101, 106, 107, 108, in the items of RP-A, RP-B, RP-C, RP-D of the input data 701 of the input table 506, based on the detection result. As explained in the description of FIG. 7, the management controller 110 records, for example, "P (Present)" in the case where the connection is made, and records, for example, "A (Absent)" in the case where the connection is not made.

In Step 602, the detecting unit 503 of the management controller 110 compares the stored connection state information of the input data 701 with the input data 801 of the expectation value table 507, and determines whether there is a configuration error. In Step 603, when determined that there is no configuration error, the detecting unit 503 of the management controller 110 executes a procedure of Step 604. When determined that there is a configuration error, the management controller 110 ends the process by Step 606.

The case of the configuration error in the first embodiment represents the case where the management controller 110 and the PCI Express Switch 105 of the PCI Express I/F adaptor 101 are not connected with each other. The case where there is no configuration error in the first embodiment represents the case where the management controller 110 and the PCI Express Switch 105 of the PCI Express I/F adaptor 101 are connected with each other.

When there is a configuration error in the first embodiment, in Step 601, the management controller 110 detects that no connection is made to the PCI Express Switch 105 of the PCI Express I/F adaptor 101, and stores connection state information representing that no connection is made in the item of RP-A of the input data 701. In Step 602, the management controller 110 compares the connection state information of the input data 701 with the input data 801 of the expectation value table 507, and detects coincidence information therefrom. The management controller 110 detects coincidence with any of "#9 to #16" having the connection state information representing that no connection is made in the item of RP-A of the input data 801 of the expectation value table 507, and acquires the configuration setting value 802 corresponding to the coincidence input data 801. The management controller 110 acquires the configuration setting values 802 of "Error" in "#9 to #16", and determines that they have the configuration error in Step 603.

When it is determined that there is no configuration error, in Step 604, the detecting unit 503 of the management controller 110 acquires, in the expectation value table 507, the configuration setting value 802, VMODE setting value 803, MUX setting value 804 corresponding to the input data 801 coinciding with the connection state information of the input data 701, and records them in the configuration setting value 702, VMODE setting value 703, MUX setting value 704 of the input table 506.

In Step 506, the switch control unit 505 of the management controller 110 sets virtual switches for the PCI Express Switches 105 on the PCI Express I/F adaptors 101, 106 to 108, in accordance with the value recorded in the VMODE setting value 703 of the input table 506. The VMODE setting values 703, 803 represent the number of virtual switches set in Step 605.

The MUX control unit 504 of the management controller 110 sets the MUX B102, MUX C103, MUX D104 on the PCI Express I/F adaptor 101, in accordance with the value recorded in the MUX setting value 704 of the input table 506. In Step 606, the management controller 110 ends the process.

For example, in the case of the configuration of the computer illustrated in FIG. 1, as described above, the management controller 110 records information like "P" representing connection is made, in the items of RP-A, RP-B, RP-C, RP-D of the input data 701. In Step 604, the detecting unit 503 acquires, in the expectation value table 507, "4 to 16" as the configuration setting value 802 of "#1" corresponding to the input data 801 coinciding with the input data 701, "1" as the VMODE setting value (the number of virtual switches) 803, and "MUX B:EX, MUX C:EX, MUX D:EX" as the MUX setting values 804, and records them respectively in the configuration setting value 702, VMODE setting value 703, MUX setting value 704 of the input table 506.

In Step 605, the switch control unit 505 sets that one virtual switch (Virtual Switch) exists in the PCI Express Switch on each of the PCI Express I/F adaptors 101, 106 to 108, in accordance with the value "1" recorded in the VMODE setting value (the number of virtual switches) 703 of the input table 506. Specifically, the switch control unit 505 transmits a request that one virtual switch exists, to the PCI Express Switches 105 on the PCI Express I/F adaptors 101, 106 to 108. The PCI Express Switches 105 on the PCI Express I/F adaptors 101, 106 to 108 set the virtual switches to be only one by, for example, generating/deleting the virtual switches, in response to the received request.

The MUX control unit 504 sets MUX B102, MUX C103, MUX D104 on the PCI Express I/F adaptor 101, in accordance with the values "MUX B:EX, MUX C:EX, MUX D:EX" recorded in the MUX setting value 704 of the input table 506. Specifically, the MUX control unit 504 transmits a request for connection to the external ports 144, 145, 146, respectively to the MUX B102, MUX C103, MUX D104. The MUX B102, MUX C103, MUX D104 set for connection to the external ports 144, 145, 146, in response to the received request.

A request of the MUX control unit 504 is transmitted. This request is that a corresponding multiplexer is connected to the external port when the value recorded in the MUX setting value 704 of the input table 506 is "EX", and that a corresponding multiplexer is connected to the PCI Express Switch 105 on the PCI Express I/F adaptor 101 when the value is "IN". Then, the setting is done in the multiplexers.

In the case of the configuration of the computer illustrated in FIG. 1, the RP-A 140, RP-B 141, RP-C 142, RP-D 143 of the I/O controller 100 are connected to the I/O devices 111 to 126 via one virtual switch of the PCI Express Switches 105 on the PCI Express I/F adaptors 101, 106, 107, 108. The same numbers, that is, one, of root port are connected to the PCI Express Switches 105 on the PCI Express I/F adaptors 101, 106 to 108.

As described above, assuming that the I/O devices up to four can be connected to the PCI Express I/F adaptors 101, 106 to 108, the computer illustrated in FIG. 1 can be connected to sixteen I/O devices 111 to 126. Thus, the number of root ports and the number of connectable I/O devices are respectively four and sixteen, and the number of root ports and the connectable I/O devices correspond to the values "4 to 16" recorded in the configuration setting value 702 of the input table 506. The configuration setting values 702, 802 represent "the number of root ports to the number of connectable I/O devices", that is, the number of connectable I/O devices to the number of root ports.

Next, in the case of the configuration of the computer illustrated in FIG. 2, as described above, the management controller 110 records "P", "A", "P", "A" respectively in the items of RP-A, RP-B, RP-C, RP-D of the input data 701. In Step 604, the detecting unit 503 acquires, in the expectation value table 507, "4 to 8" as a configuration setting value 802 of "#6" corresponding to the input data 801 coinciding with the input data 701, "2" as the VMODE setting value (the number of virtual switches) 803, and "MUX B:IN, MUX C: EX, MUX D: EX" as the MUX setting value 804s. Then, it records them in the configuration setting value 702, VMODE setting value 703, MUX setting value 704 of the input table 506.

In Step 605, the switch control unit 505 sets that two virtual switches exist in the PCI Express Switch 105 of the PCI Express I/F adaptors 101, 106, in accordance with the value "2" recorded in the VMODE setting value (the number of virtual switches) 703 of the input table 506.

The MUX control unit 504 sets the MUX B102, MUX C103, MUX D104 on the PCI Express I/F adaptor 101, in accordance with the value "MUX B:IN, MUX C:EX, MUX D:EX" recorded in the MUX setting value 704 of the input table 506. Specifically, the MUX control unit 504 transmits a request for connecting to the PCI Express Switch 105 on the PCI Express I/F adaptor 101 to the MUX B102, and transmits a request for connecting to the external ports 145, 146 to the MUX C103, MUX D104. The MUX B102 is connected to the PCI Express Switch 105 on the PCI Express I/F adaptor 101, in response to the received request. The MUX C103, MUX D104 are connected respectively to the external ports 145, 146, in response to the received request.

In the case of the configuration of the computer illustrated in FIG. 2, the RP-A140, RP-B141 of the I/O controller 100 are connected to the I/O devices 111 to 114, via the two virtual switches of the PCI Express Switch 105 of the PCI Express I/F adaptor 101. The RP-C142, RP-D143 of the I/O controller 100 are connected to the I/O devices 115 to 118, via the two virtual switches of the PCI Express I/F adaptor 106. The same numbers, that is, two, of the root ports are connected to the PCI Express Switches 105 on the PCI Express I/F adaptors 101, 106.

As described above, assuming that the I/O devices up to four can be connected to the PCI Express I/F adaptors 101, 106, the computer illustrated in FIG. 2 can be connected to the eight I/O devices 111 to 118. Thus, the number of root ports and the number of connectable I/O devices are respectively four and eight, and the number of root ports and the number of connectable. I/O devices correspond to the value "4 to 8" recorded in the configuration setting value 702 of the input table 506.

In the case of the configuration of the computer illustrated in FIG. 3, as described above, the management controller 110 records "P", "A", "A", "A" respectively in the items of RP-A, RP-B, RP-C, RP-D of the input data 701. In Step 604, the detecting unit 503 acquires, in the expectation value table 507, "4 to 4" as the configuration setting value 802 of "#8" corresponding to the input data 801 coinciding with the input data 701, "4" as the VMODE setting value (the number of virtual switches) 803, and "MUX B:IN, MUX C:IN, MUX D:IN"" as the MUX setting values 804. Then, it records them in the configuration setting value 702, VMODE setting value 703, MUX setting value 704 of the input table 506.

In Step 605, the switch control unit 505 sets that four virtual switches exist in the PCI Express Switch on the PCI Express I/F adaptor 101, in accordance with the value "4" recorded in the VMODE setting value (the number of virtual switches) 703 of the input table 506.

The MUX control unit 504 sets the MUX B102, MUX C103, MUX D104 on the PCI Express I/F adaptor 101, in accordance with the values "MUX B:IN, MUX C:IN, MUX D:IN" recorded in the MUX setting values 704 of the input table 506. Specifically, the MUX control unit 504 transmits a request for connection to the PCI Express Switch 105 on the PCI Express I/F adaptor 101, to the MUX B102, MUX C103, MUX D104. The MUX B102, MUX C103, MUX D104 are connected to the PCI Express Switch 105 on the PCI Express I/F adaptor 101, in response to the received request.

In the case of the configuration of the computer illustrated in FIG. 3, the RP-A140, RP-B141, RP-C142, RP-D143 of the I/O controller 100 are connected to the I/O devices 111 to 114, via the four virtual switches of the PCI Express Switch 105 of the PCI Express I/F adaptor 101. The number of root ports for the connection for the PCI Express Switch 105 on the PCI Express I/F adaptor 101 is four.

As described above, assuming that the I/O devices up to four can be connected to the PCI Express I/F adaptor 101, the computer illustrated in FIG. 3 can be connected to the I/O devices 111 to 114. Thus, the number of root ports and the number of connectable I/O devices are respectively four and four, and the number of root ports and the number of connectable I/O devices are the values "4 to 4" recorded in the configuration setting value 702 of the input table 506.

Thus, the PCI Express Switch 105 and the multiplexers 102 to 104 are set to attain the proper throughput corresponding to the maximum number of connections of the I/O devices, thereby enabling to provide a computer suitable for scale-out.

Second Embodiment

The same constituent elements as those of the first embodiment are identified with the same reference numerals, and will not be described over and over. A computer of the second embodiment has a configuration in which PCI Express I/F adaptors 106 to 109 and root ports 140 to 143 of an I/O controller 100 are connected with each other without via multiplexers 102 to 104, external ports 144 to 146.

Figure 9:
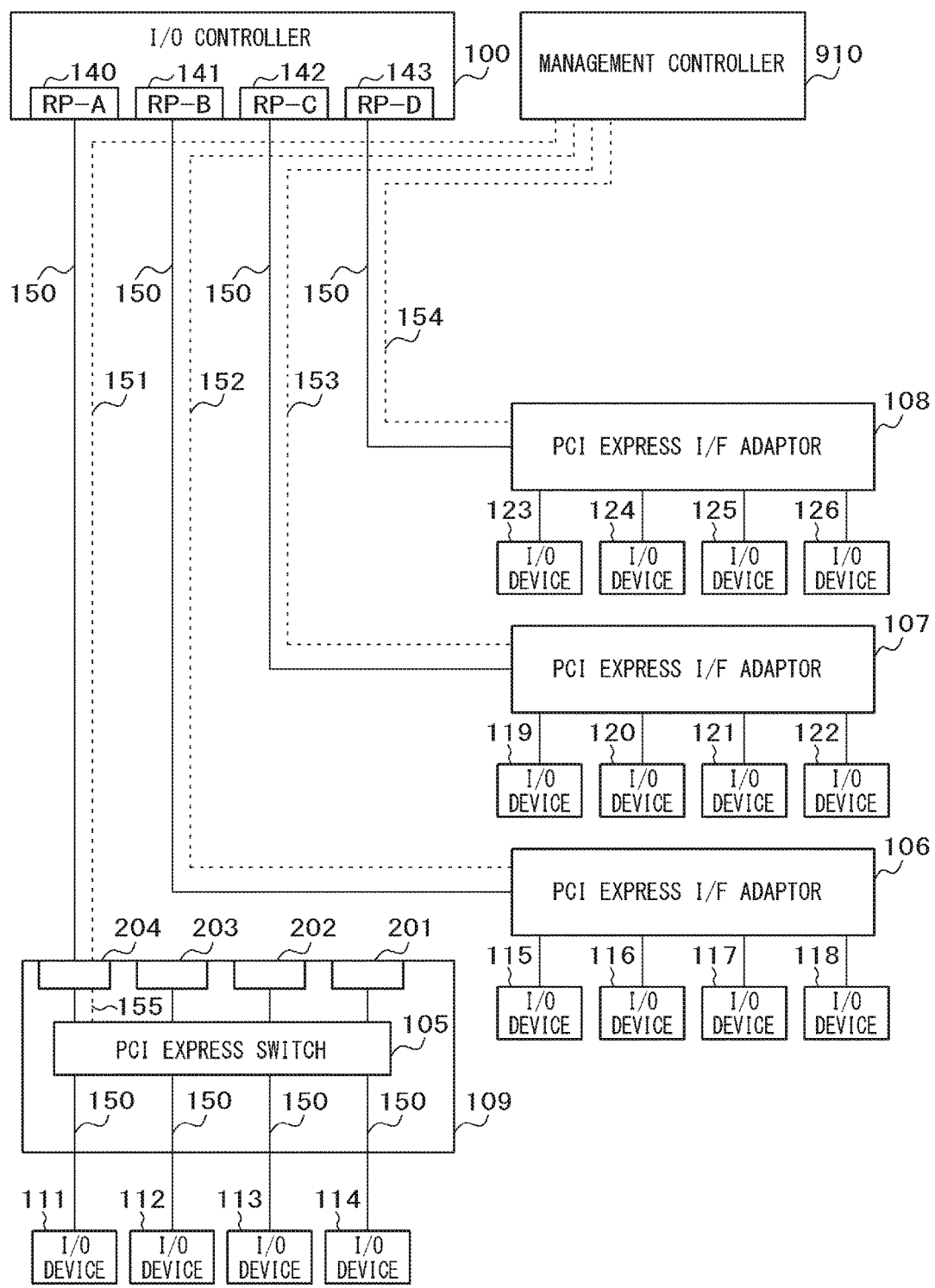
FIG. 9 is a diagram illustrating a configuration of a computer in a second embodiment.

FIG. 9 is a diagram illustrating the configuration of the computer of the second embodiment. A configuration of the PCI Express I/F adaptor 109 is the same as that of the PCI Express I/F adaptor 106. The PCI Express I/F adaptor 109 can be connected to I/O devices 111 to 114. The PCI Express I/F adaptor 109 is not necessarily to include multiplexers 102 to 104, unlike the PCI Express I/F adaptor 101.

The root ports 140, 141, 142, 143 are connected to a PCI Express Switch 105 of each of the PIC Express I/F, adaptors 109, 106, 107, 108, through a signal line 150. The PCI Express Switch 105 can be connected to the I/O devices 111 to 126.

The computer has an I/O controller 100, the PCI Express I/F adaptors 106 to 109, a management controller 910, and the I/O devices 111 to 126. In the configuration of the computer, some or all of the PCI Express I/F adaptors 106 to 109 and the I/O devices 111 to 126 may be excluded. The computer is connected to external units through the I/O devices 111 to 126 or a network, and transmits and receives information (for example, input/output instructions or a response to input/output instructions).

Each of the PCI Express I/F adaptors 106 to 109 includes the PCI Express Switch 105. Assuming that the I/O devices up to four can be connected to each of the PCI Express I/F adaptors 106 to 109, the computer illustrated in FIG. 9 can be connected to sixteen I/O devices 111 to 126.

The management controller 910 is connected to the PCI Express Switch 105 of each of the PCI Express I/F adaptors 106 to 109 through control signal lines 151 to 155.

The signal lines 150 can mutually, or the control signal lines 151 to 156 can mutually be connected. However, the signal lines 150 and the control signal lines 151 to 155 are not connected with each other. The signal lines 150 are cables for transmitting information (for example, input/output instructions, response for input/output instructions) or wirings on the printed substrate, between the I/O controller 100 and the I/O devices 111 to 126. The control signal lines 151 to 155 are signal lines for transmitting control information between the management controller 910 and the PCI Express Switches 105.

Figure 10:
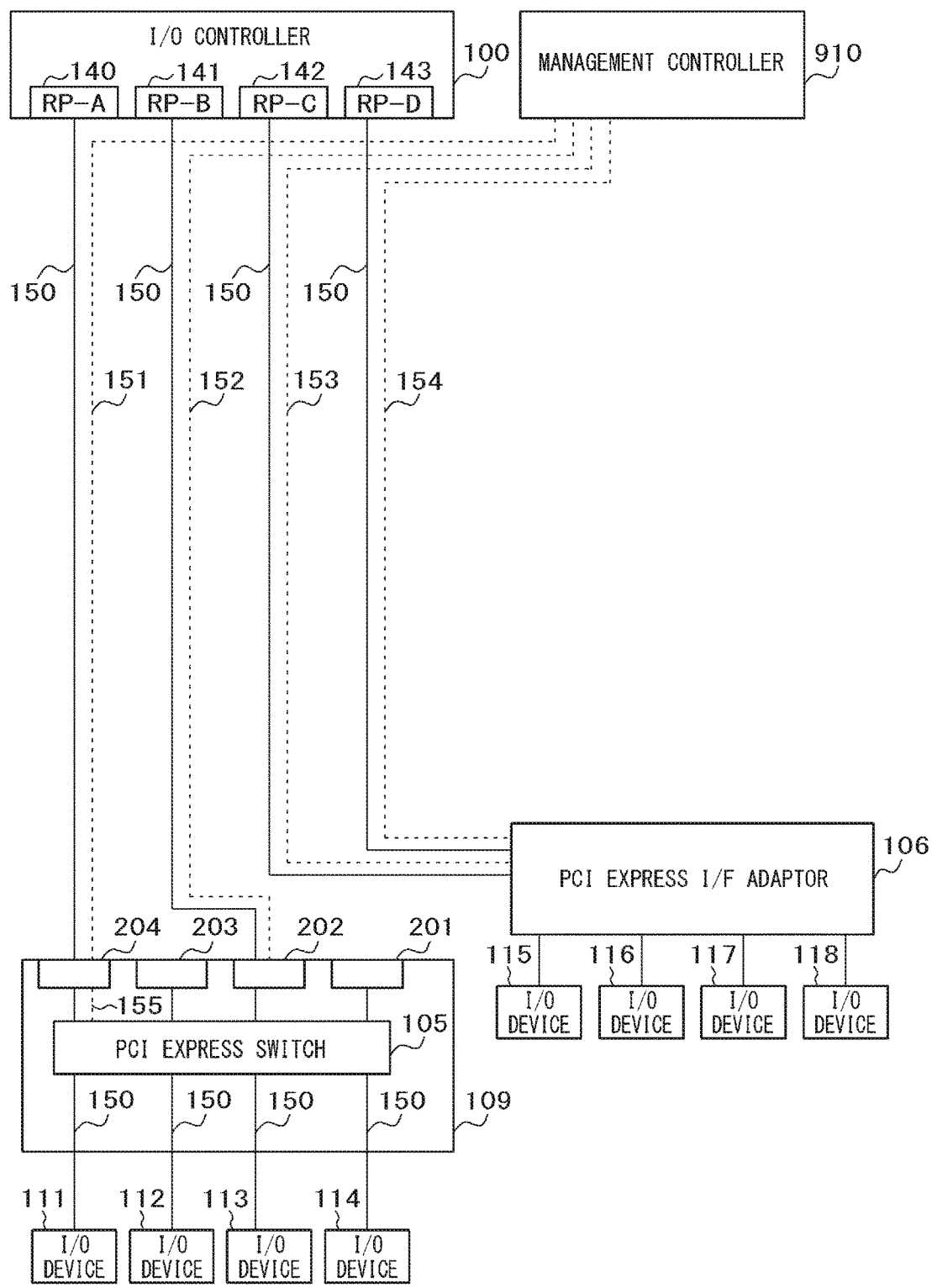
FIG. 10 is a diagram illustrating a first modification example of the configuration of the computer in the second embodiment.

FIG. 10 is a diagram illustrating a first modification example of the configuration of the computer in the second embodiment. Descriptions will now be made of a different configuration of the computer illustrated in FIG. 10, from that of the computer illustrated in FIG. 9. None of the I/O controller 100 and the management controller 910 of the computer illustrated in FIG. 10 is connected to the PCI Express I/F adaptors 107, 108. The RP-A140, RP-B141 are connected to the PCI Express Switch 105 of the PCI Express I/F adaptor 109 through the signal line 150. The RP-C142, RP-D143 are connected to the PCI Express Switch 105 of the PCI Express I/F adaptor 106 through the signal line 150.

The management controller 910 is connected to the PCI Express Switch 105 of the PCI Express I/F adaptor 109 through the control signal lines 151, 155. The management controller 910 is connected to the PCI Express Switch 105 of the PCI Express I/F adaptor 106 through the control signal lines 153, 155. Assuming that the I/O devices up to four can be connected to each of the PCI Express I/F adaptors 106, 109, the computer illustrated in FIG. 10 can be connected to eight I/O devices 111 to 118.

Figure 11:
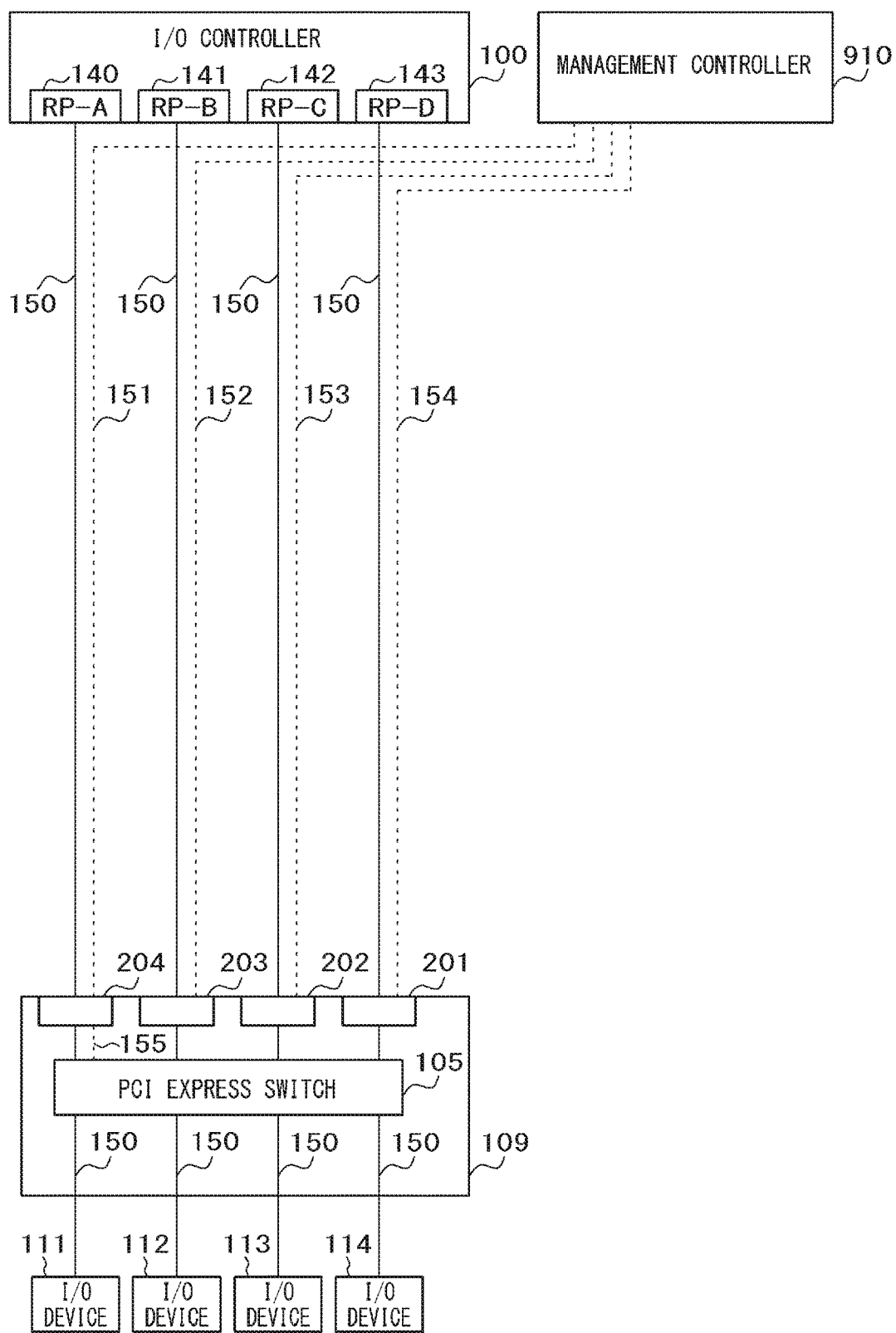
FIG. 11 is a diagram illustrating a second modification example of the configuration of the computer in the second embodiment.

FIG. 11 is a diagram illustrating a second modification example of the configuration of the computer in the second embodiment. Descriptions will now be made of a different configuration of the computer illustrated in FIG. 11, from that of the computer illustrated in FIG. 9. None of the I/O controller 100 and the management controller 910 of the computer illustrated in FIG. 11 is connected to the PCI Express I/F adaptors 106, 107, 108.

The RP-A140, RP-B141, RP-C142, RP-D143 are connected to the PCI Express Switch 105 of the PCI Express I/F adaptor 109 through the signal line 150. The management controller 910 is connected to the PCI Express Switch 105 of the PCI Express I/F adaptor 109 through the control signal lines 151, 155. Assuming that the I/O devices up to four can be connected to the PCI Express I/F adaptor 109, the computer illustrated in FIG. 11 can be connected to four I/O devices 111 to 114.

To change from the configuration of the computer illustrated in FIG. 9 to the configuration of the computer illustrated in FIG. 10 or FIG. 11, a connection change may be made to the signal line 150, control signal lines 151 to 154 between the PCI Express I/F adaptors 106 to 109, to the I/O controller 100 and the management controller 910. The computer is not limited to the configuration illustrated in FIG. 9 to FIG. 11.

Figure 12:
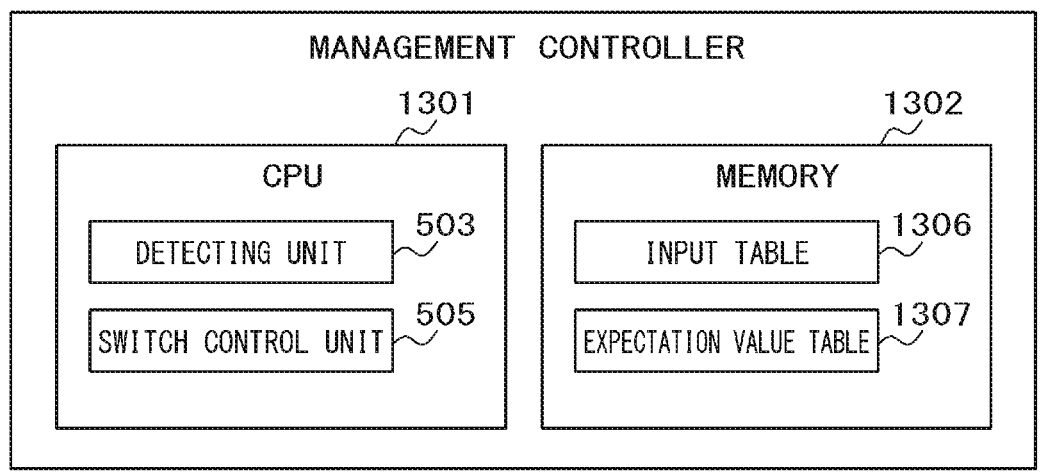
FIG. 12 is a diagram illustrating a configuration of a management controller in the second embodiment.

FIG. 12 is a diagram illustrating a configuration of the management controller 910. The management controller 910 is, for example, a BMC (Baseboard Management Controller) or a service processor (Service Processor: SVP). The management controller 910 has a CPU 1301 and a memory 1302. The CPU 1301 has a detecting unit 503 and a switch control unit 505 controlling the PCI Express switch 105. The detecting unit 503, the switch control unit 505 may be the hardware, or may be realized by the software executed by the CPU 1301. The memory 1302 has an input table 1306 and an expectation value table 1307.

Figures 13, 14:
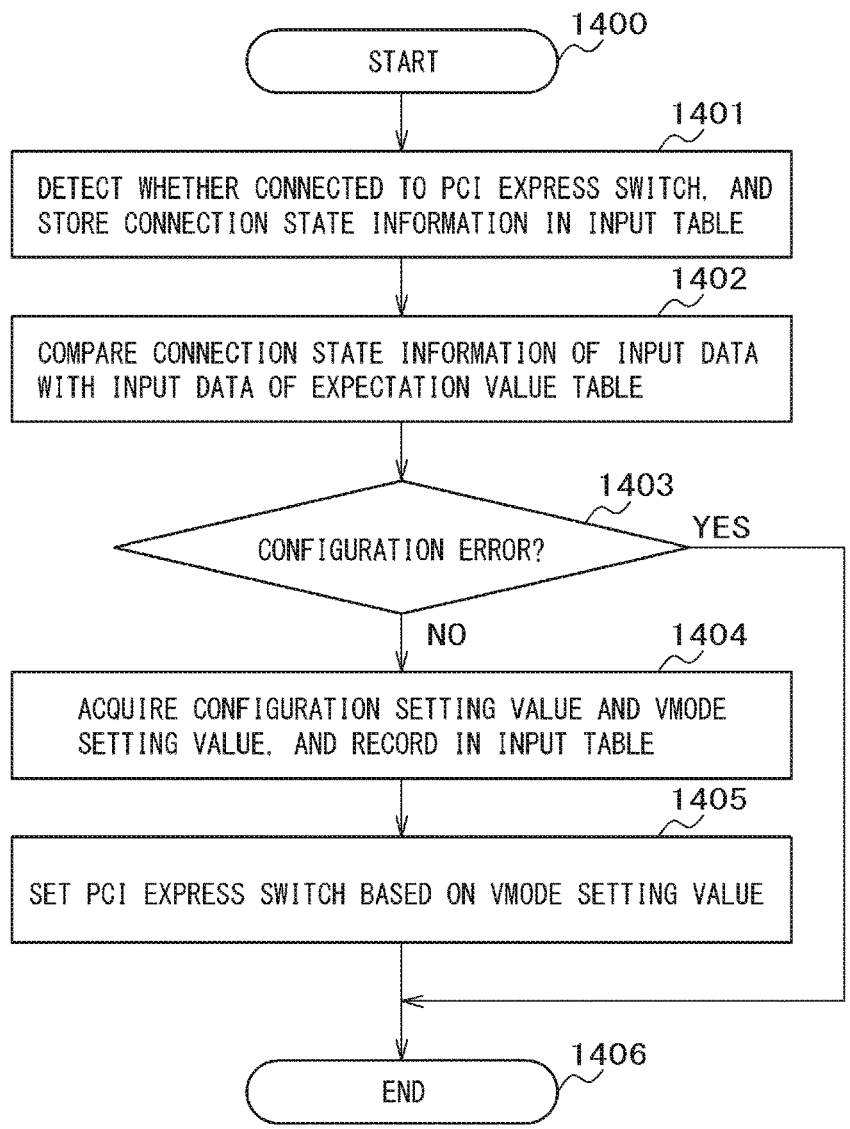
FIG. 13 is a flowchart showing a setting process for a PCI Express Switch in the second embodiment.
FIG. 14 is a diagram illustrating a configuration of an input table in the second embodiment.

FIG. 14 is a diagram illustrating a configuration of the input table 1306. The input table 1306 is configuration setting information representing the configuration of the computer. The input table 1306 manages the input data 701, the configuration setting values 702, the VMODE setting values 703, in association with each other. The items of the input table 1306 have values that may be changed in accordance with the configuration of the computer.

In the case of the configuration of the computer illustrated in FIG. 9, the management controller 910 is connected to the PCI Express Switches 105 of the respective PCI Express I/F adaptors 106 to 109, through the control signal lines 151 to 155. In this case, information "P" representing that connection is made is recorded in the items of the RP-A, RP-B, RP-C, RP-D of the input data 701.

In the case of the configuration of the computer illustrated in FIG. 10, the management controller 910 is connected to the PCI Express Switches 105 of the respective PCI Express I/F adaptors 109, 106, through the control signal lines 151, 153, 155. The management controller 910 is not connected to the PCI Express Switches 105 of the PCI Express I/F adaptors 107, 108. In this case, for example, "P", "A", "P", "A" are recorded in the items of the RP-A, RP-B, RP-C, RP-D of the input data 701.

In the case of the configuration of the computer illustrated in FIG. 11, the management controller 910 is connected to the PCI Express Switch 105 of the PCI Express I/F adaptor 109. The management controller 910 is not connected to the PCI Express Switches 105 of the PCI Express I/F adaptors 106 to 108. In this case, for example, "P", "A", "A", "A" are recorded in the items of the RP-A, RP-B, RP-C, RP-D of the input data 701.

FIG. 15 is a diagram illustrating a configuration of the expectation value table 1307. The expectation value table 1307 is configuration management information for managing the input data 801, the configuration setting values 802, and the VMODE setting values 803, in association with each other. Values are input in advance in the items of the expectation value table 1307. Unlike the input table 1306, the values are not updated in the items of the expectation value table 1307, even if the configuration of the computer is changed.

FIG. 13 is a flowchart showing a setting process for the PCI Express Switch 105.

In Step 1400, the management controller 910 starts a setting process for the PCI Express Switch 105. This starting timing includes, for example, timing when the computer is activated, timing when the management controller 910 detects a configuration change of the computer, or timing when the management controller 910 receives a request for staring the setting process from the user or the management computer.

In Step 1401, the detecting unit 503 of the management controller 910 detects whether or not connection is made to the PCI Express Switches 105 of the PCI Express I/F adaptors 106 to 109 via the control signal lines 151 to 155. The management controller 910 stores connection state information representing whether or not the connection is made to each of the PCI Express Switches 105 of the PCI Express I/F adaptors 109, 106, 107, 108 in, the items of the RP-A, RP-B, RP-C, RP-D of the input data 701 of the input table 1306, based on the detection result.

In Step 1402, the detecting unit 503 of the management controller 910 compares the stored connection state information of the input data 701 with the input data 801 of the expectation value table 1307, and determines whether there is a configuration error. In Step 1403, when it is determined that there is no configuration error, the detecting unit 503 of the management controller 910 executes a procedure of 1404. When it is determined that there is a configuration error, the management controller 910 ends the process by Step 1406.

The case of the configuration error in the second embodiment represents the case where the management controller 910 is not connected to any of the PCI Express Switch 105. The case where there is no configuration in the second embodiment represents the case where the management controller 910 is connected to at least one or more PCI Express Switches 105.

When it is determined that there is no configuration error, in Step 1404, the detecting unit 503 of the management controller 910 acquires, in the expectation value table 1307, the configuration setting value 802, VMODE setting value 803 corresponding to the input data 801 coinciding with the connection state information of the input data 701, and records them in the configuration setting value 702, VMODE setting value 703 of the input table 1306.

In Step 1405, the switch control unit 505 of the management controller 910 sets the PCI Express Switch 105 on each of the PCI Express I/F adaptors 106 to 109, in accordance with the value recorded in the VMODE setting value 703 of the input table 1306. In Step 1406, the management controller 910 ends the process.

In the case of the configuration of the computer illustrated in FIG. 9, as described above, the management controller 910 records information like "P" representing that connection is made, in the items of RP-A, RP-B, RP-C, RP-D of the input data 701. In Step 1404, the detecting unit 503 acquires, in the expectation value table 1307, "4 to 16" as the configuration setting values 802 of "#1" corresponding to the input data 801 coinciding with the input data 701, and "1" as the VMODE setting value (the number of virtual switches) 803, and records them respectively in the configuration setting value 702, VMODE setting value 703 of the input table 1306.

In Step 1405, the switch control unit 505 sets that one virtual switch (Virtual Switch) exists in the PCI Express Switch 105 on the PCI Express I/F adaptors 106 to 109, in accordance with the value "1" recorded in the VMODE setting value (the number of virtual switches) 703 of the input table 1306. Specifically, the switch control unit 505 transmits a request for the number of virtual switches to be one, to the PCI Express Switch 105 on the PCI Express I/F adaptors 106 to 109. The PCI Express Switches 105 on the PCI Express I/F adaptors 106 to 109 set the virtual switches to be only one by, for example, generating/deleting the virtual switches, in response to the received request.

In the case of the configuration of the computer illustrated in FIG. 9, the RP-A 140, RP-B 141, RP-C 142, RP-D 143 of the I/O controller 100 are connected to the I/O devices 111 to 126 via one virtual switch of the PCI Express Switches 105 on the PCI Express I/F adaptors 106 to 109. The same numbers, that is, one, of root port is connected to the PCI Express Switches 105 on the PCI Express I/F adaptors 106 to 109.

As described above, assuming that the I/O devices up to four can be connected to the PCI Express I/F adaptors 106 to 109, the computer illustrated in FIG. 1 can be connected to sixteen I/O devices 111 to 126. Thus, the number of root ports and the number of connectable I/O devices are respectively four and sixteen, and the number of root ports and the connectable I/O devices correspond to the value "4 to 16" recorded in the configuration setting value 702 of the input table 1306.

Next, in the case of the configuration of the computer illustrated in FIG. 10, as described above, the management controller 910 records "P", "A", "P", "A" respectively in the items of RP-A, RP-B, RP-C, RP-D of the input data 701. In Step 1404, the detecting unit 503 acquires, in the expectation value table 1307, "4 to 8" as configuration setting values 802 of "#6" corresponding to the input data 801 coinciding with the input data 701 and "2" as the VMODE setting value 803. Then, it records them in the configuration setting value 702, VMODE setting value 703 of the input table 506.

In Step 1405, the switch control unit 505 sets that two virtual switches exist in the PCI Express Switches 105 on the PCI Express I/F adaptors 109, 106, in accordance with the value "2" recorded in the VMODE setting value 703 of the input table 1306.

In the case of the configuration of the computer illustrated in FIG. 10, the RP-A140, RP-B141 of the I/O controller 100 are connected to the I/O devices 111 to 114, via the two virtual switches of the PCI Express Switch 105 of the PCI Express I/F adaptor 109. The RP-C142, RP-D143 of the I/O controller 100 are connected to the I/O devices 115 to 118, via the two virtual switches of the PCI Express Switch 105 of the PCI Express I/F adaptor 106. The same numbers, that is, two, of the root ports are connected to the PCI Express Switch 105 on the PCI Express I/F adaptors 109, 106.

As described above, assuming that the I/O devices up to four can be connected to the PCI Express I/F adaptors 109, 106, the computer illustrated in FIG. 10 can be connected to the eight I/O devices 111 to 118. Thus, the number of root ports and the number of connectable I/O devices are respectively four and eight, and the number of root ports and the number of connectable I/O devices correspond to the values "4 to 8" recorded in the configuration setting value 702 of the input table 1306.

In the case of the configuration of the computer illustrated in FIG. 11, as described above, the management controller 910 records "P", "A", "A", "A" respectively in the items of RP-A, RP-B, RP-C, RP-D of the input data 701. In Step 1404, the detecting unit 503 acquires, in the expectation value table 1307, and "4 to 4" as the configuration setting values 802 of "#8" corresponding to the input data 801 coinciding with the input data 701, "4" as the VMODE setting value 803. Then, it records them in the configuration setting value 702, VMODE setting value 703 of the input table 1306.

In Step 1405, the switch control unit 505 sets that four virtual switches exist in the PCI Express Switch 105 on the PCI Express I/F adaptor 109, in accordance with the value "4" recorded in the VMODE setting value 703 of the input table 1306.

In the case of the configuration of the computer illustrated in FIG. 11, the RP-A140, RP-B141, RP-C142, RP-D143 of the I/O controller 100 are connected to the I/O devices 111 to 114, via the four virtual switches of the PCI Express Switch 105 of the PCI Express I/F adaptor 109. The number of root ports to be connected to the PCI Express Switch 105 on the PCI Express I/F adaptor 109 is four.

As described above, assuming that the I/O devices up to four can be connected to the PCI Express I/F adaptor 109, the computer illustrated in FIG. 11 can be connected to the I/O devices 111 to 114. Thus, the number of root ports and the number of connectable I/O devices are respectively four and four, and the number of root ports and the number of connectable I/O devices are the values "4 to 4" recorded in the configuration setting value 702 of the input table 1306.

Thus, the PCI Express Switch 105 is set to attain the proper throughput corresponding to the maximum number of connections of the I/O devices, thereby enabling to provide a computer suitable for scale-out.

As described in the first embodiment and the second embodiment, it is possible to perform automatic setting of the PCI Express Switch 105 or the multiplexers 102 to 104, to attain the same maximum numbers of the I/O devices for the connections to the root ports 140 to 143 of the I/O controller 100 via the PCI Express Switch 105, in accordance with the number of the PCI Express Switches 105 to be connected to the I/O controller 100. Therefore, it is possible to improve the throughput deviation between the root ports or the I/O devices, and to improve the throughput.

REFERENCE SIGNS LIST

100 I/O controller, 101 PCI Express I/F adaptor, 102 to 104 Multiplexer, 105 PCI Express Switch, 106 to 109 PCI Express I/F adaptor, 110 Management Controller, 111 to 126 I/O Device, 910 Management Controller

The invention claimed is:

1. A computer comprising:
one or more I/O switches;
a multiplexer;
one or more I/O devices which are connected to the one or more I/O switches;
a management controller which is configured to:
    store configuration management information for managing a connection state with the one or more I/O switches, a number of virtual switches, and a setting value of the multiplexer in association with each other,
    detect the connection state with the one or more I/O switches, and acquire the number of virtual switches and the setting value of the multiplexer corresponding to the detected connection state with the I/O switches by referring to the configuration management information, and
    set the acquired number of virtual switches for each of the connected one or more I/O switches and set the acquired setting value for the multiplexer;
an I/O controller which has a plurality of ports configured to be connected to the connected one or more I/O devices via the set virtual switches and the set multiplexer; and
wherein the multiplexer is connected to each of the ports and each of the connected one or more I/O switches, and
wherein the set virtual switches and the set multiplexer are configured to connect a same number of the ports to each of the connected one or more I/O switches based on the acquired number of virtual switches and the acquired setting value.

2. A method of controlling a computer including one or more I/O switches, one or more I/O devices connected to the one or more I/O switches, a management controller, a multiplexer, and an I/O controller, the method comprising the steps of:
detecting a connection state with the one or more I/O switches, by the management controller;
acquiring a number of virtual switches and a setting value of the multiplexer corresponding to the detected connection state with the one or more I/O switches in association with each other by referring to configuration management information for managing the connection state with the one or more I/O switches, the number of virtual switches, and the setting value of the multiplexer in association with each other, by the management controller;
setting the acquired number of virtual switches for each of the connected one or more I/O switches and setting the acquired setting value for the multiplexer, by the management controller; and connecting each of a plurality of ports of the I/O controller to the connected one or more I/O devices via the set virtual switches and the set multiplexer, wherein the multiplexer is connected to each of the ports and each of the connected one or more I/O switches, and wherein the set virtual switches and the set multiplexer connect a same number of the ports to each of the connected one or more I/O switches based on the acquired number of virtual switches and the acquired setting value.

3. The computer according to claim 1, wherein the one or more I/O switches are PCI express switches.

4. The computer according to claim 1, wherein the multiplexer and a first I/O switch of the one or more I/O switches are configured in a PCI express I/F adaptor.

5. The computer according to claim 4, wherein the PCI express I/F adaptor includes a plurality of external ports which are configured to be connected to the one or more I/O switches.

6. The computer according to claim 1, wherein each of the one or more I/O switches are configured in a respective one or more PCI express I/F adaptors.

7. The computer according to claim 2, wherein the one or more I/O switches are PCI express switches.

8. The computer according to claim 2, wherein the multiplexer and a first I/O switch of the one or more I/O switches are configured in a PCI express I/F adaptor.

9. The computer according to claim 8, wherein the PCI express I/F adaptor includes a plurality of external ports which are configured to be connected to the one or more I/O switches.

10. The computer according to claim 2, wherein each of the one or more I/O switches are configured in a respective one or more PCI express I/F adaptors.

* * * * *